(12) United States Patent
Shahin

(10) Patent No.: US 12,504,050 B2
(45) Date of Patent: Dec. 23, 2025

(54) BRAKE DRUM ASSEMBLY WITH DUST COLLECTION VIA THROUGH HOLES

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 392 days.

(21) Appl. No.: 18/325,269

(22) Filed: May 30, 2023

(65) Prior Publication Data

US 2023/0383799 A1    Nov. 30, 2023

(30) Foreign Application Priority Data

May 31, 2022 (DE) .......................... 102022205550.0

(51) Int. Cl.
*F16D 65/10* (2006.01)
*F16D 65/00* (2006.01)

(52) U.S. Cl.
CPC ......... *F16D 65/0031* (2013.01); *F16D 65/10* (2013.01); *F16D 2200/0008* (2013.01); *F16D 2200/0034* (2013.01)

(58) Field of Classification Search
CPC ................. F16D 65/10; F16D 65/0031; F16D 2200/0008; F16D 2200/0034; F16D 2051/001; F16D 2065/13
See application file for complete search history.

(56) References Cited

U.S. PATENT DOCUMENTS

| 2,746,577 | A | * | 5/1956 | Butler | F16D 65/847 188/264 A |
| 3,972,089 | A | * | 8/1976 | Parks | B08B 15/026 15/345 |
| 5,964,323 | A | * | 10/1999 | Henry | F16D 65/10 188/218 R |
| 8,960,383 | B2 | * | 2/2015 | Pahle | F16D 65/847 188/264 W |
| 9,145,937 | B2 | * | 9/2015 | Fakhoury | F16D 65/10 |

(Continued)

FOREIGN PATENT DOCUMENTS

| CN | 213973943 U | 8/2021 |
| CN | 214146368 U | 9/2021 |

(Continued)

OTHER PUBLICATIONS

DE OA dated Apr. 5, 2023.

*Primary Examiner* — Thomas W Irvin
(74) *Attorney, Agent, or Firm* — Harvest IP Law, LLP

(57) ABSTRACT

The invention relates to a brake drum assembly for braking at least one vehicle wheel that rotates about a rotation axis, the brake drum assembly comprising:
   a brake drum configured to rotate about the rotation axis and having a ring section extending circumferentially about the rotation axis and an end wall section extending at an angle to the rotation axis, the brake drum having an inner surface bounding at least part of a receiving space of the brake drum; at least one brake dust collector that faces an outer surface of the brake drum,
wherein the brake drum comprises at least one throughhole providing a path through which brake dust can move from the receiving space to the dust collector.

16 Claims, 9 Drawing Sheets

(56) References Cited

U.S. PATENT DOCUMENTS

| | | | | |
|---|---|---|---|---|
| 9,322,443 | B2* | 4/2016 | Bordere | F16D 65/10 |
| 9,709,114 | B2* | 7/2017 | Fakhoury | F16D 65/827 |
| 10,330,160 | B2* | 6/2019 | Goodell | F16D 65/22 |
| 11,635,118 | B2* | 4/2023 | Sabeti | F16D 65/827 |
| | | | | 301/6.3 |
| 2014/0069752 | A1* | 3/2014 | Fakhoury | F16D 65/10 |
| | | | | 188/218 R |
| 2016/0017947 | A1* | 1/2016 | Fakhoury | F16D 65/10 |
| | | | | 188/218 R |
| 2019/0128350 | A1* | 5/2019 | Goodell | F16D 65/10 |
| 2023/0373448 | A1* | 11/2023 | Shahin | F16D 65/0031 |
| 2023/0375054 | A1* | 11/2023 | Shahin | F16D 65/0006 |
| 2023/0417299 | A1* | 12/2023 | Shahin | F16D 65/0031 |
| 2024/0401652 | A1* | 12/2024 | Shahin | F16D 51/24 |

FOREIGN PATENT DOCUMENTS

| | | | | |
|---|---|---|---|---|
| DE | 1525370 A1 | 4/1972 | | |
| DE | 7204045 U | 5/1972 | | |
| WO | 2021008887 A1 | 1/2021 | | |
| WO | WO-2021163750 A1 * | 8/2021 | | F16D 65/0037 |

\* cited by examiner

BRAKE DRUM ASSEMBLY WITH DUST COLLECTION VIA THROUGH HOLES

CROSS-REFERENCE TO RELATED APPLICATION

This application is based on and claims priority under 35 U.S.C. § 119 to German Patent Application No. 102022205550.0, filed on May 31, 2022 in the German Patent and Trade Mark Office, the disclosures of which are incorporated herein by reference.

TECHNICAL FIELD

The invention concerns a brake drum assembly and a brake drum for a vehicle, in particular for a road vehicle, such as a car, a bus or a truck.

BACKGROUND

Drum brakes are an established braking technology for motor vehicles. They typically comprise a brake drum having a contact surface at an inner circumferential face and a backing plate carrying brake shoes which have a friction lining for contacting the contact surface.

It is a known problem that during braking, brake dust can be generated as a result of the abrasive contact between the friction lining and the contact surface. This brake dust can be emitted into the surroundings which causes air pollution. Also, the brake dust can soil adjacent vehicle components and vehicle surfaces.

WO 2021/008887 A1 discloses a drum brake with a brake dust trap arranged inside the brake drum and specifically in a circumferentially extending groove. This arrangement requires accessing an internal space of the brake drum for mounting and removing the dust trap. This can be complicated because this space also receives a number of other components, such as the brake shoes.

SUMMARY

It is therefore an object of the present invention to improve a brake dust collection in connection with brake drums, in particular with respect to ease of assembly and maintenance.

This object is solved by the subject matter according to the attached independent claims. Preferred embodiments are set out in this description and in the dependent claims.

Accordingly, a brake drum assembly is disclosed for braking at least one vehicle wheel that rotates about a rotation axis, the brake drum assembly comprising:
- a brake drum configured to rotate about the rotation axis and having a ring section extending circumferentially about the rotation axis and an end wall section extending at an angle to the rotation axis, the brake drum having an inner surface bounding (or, put differently, confining or limiting) at least part of a receiving space of the brake drum;
- at least one brake dust collector that faces an outer surface of the brake drum (e.g. a surface that is outside of the receiving space and/or opposite to an inner surface of the brake drum bounding the receiving space),
wherein the brake drum comprises at least one through-hole providing a (fluid) path between the receiving space and the dust collector or, in other words, providing a (fluid) path through which brake dust can move from the receiving space to the dust collector.

Terms such as axial, radial and circumferential used herein may relate to the rotation axis. An axial direction may extend along said axis, a radial direction may extend orthogonally thereto and a circumferential direction may extend about or around said axis.

In a generally known manner, the receiving space can be configured to (e.g. dimensioned and/or shaped) to receive further components of the drum brake, such as at least one brake shoe, a brake actuator, a brake shoe resetting member (e.g. a spring), a backing plate to which the brake shoes are mounted or a park brake mechanism.

The brake drum may be an integral member or, differently put, a one-piece member. Alternatively it may be a multi-part member. Additionally or alternatively, it may be a cylindrical member having a circular base.

The ring section may extend concentrically to and/or may extend around the rotation axis. The ring section may be circular. It may define a cylindrical section, in particular a cylinder mantel surface or cylinder jacket (e.g. a cylinder without base surfaces). A radially outer surface of ring section (in brief: outer surface of the ring section) that e.g. faces into the surroundings and/or away from the rotation axis may define an outer circumferential face of the brake drum. A radially inner surface of the ring section (in brief: inner surface of the ring section) that e.g. faces towards the rotation axis and/or faces a radially opposite part of the ring section may define an inner circumferential face of the brake drum. A contact surface for being contacted by a brake shoe may be formed at or provided by the inner surface of the ring section. The ring section may define a largest diameter of the brake drum.

The end wall section may be plate-shaped and/or may be substantially planar. It may extend orthogonally to the rotation axis. It may merge with and/or merge into the ring section, e.g. at a radially outer rim or edge thereof. The ring section may extend orthogonally to the wall section. The wall section may extend concentrically with respect to the rotation axis.

The end wall section may comprise a connection portion for connecting the brake drum to an axle component and/or to the vehicle wheel. The brake drum may generally be configured to rotate jointly with the axle component and/or the vehicle wheel, in particular by being connected thereto by the optional connection portion. The connection portion may be a hub. It may comprise a least one through-hole, e.g. for receiving a mechanical fixing element (e.g. a bolt). The connection portion may be positioned at and/or may comprise a geometric center of the end wall section. It may be intersected by the rotation axis.

The end wall section may form a base surface of a cylinder, the mantle of which is formed by the ring section. The brake drum may be formed as a cylinder that is open on one side, e.g. by missing a base surface opposite to the end wall section.

The through-hole may extend linearly and/or radially and/or axially. Yet, it is also possible to provide a non-straight course and/or an extension at an angle to a radial direction or an axial direction. This may be provided to guide the brake dust in a desired manner towards the dust collector.

The through-hole may have a constant cross-section along its axis of extension, i.e. along its longitudinal axis. Said axis may extend from the receiving space through the ring section and towards the dust collector and/or from the inner surface to the outer surface of the ring section. Providing a respective constant cross-section simplifies production. As detailed below, a varying cross-section is, however, possible as well.

The at least one through-hole enables brake dust to move out of the receiving space (where it is generated, e.g. as a result of an abrasive contact between brake shoes and the inner surface of the brake drum) and towards the dust collector that is positioned outside of the receiving space. This means that the dust collector is not received internally within the brake drum which simplifies access to said dust collector. This improves ease of maintenance and assembly. At the same time, the brake dust is still effectively collected or, in other words, effectively trapped by the brake dust collector due to the connection to the receiving space formed by the through hole.

Yet, at the same time, the through-hole (in particular when a plurality thereof is provided, such as at least ten or at least twenty through-holes) also provides further advantages such as a weight reduction of the brake drum. Further, it may act as a noise absorbing and/or noise cancelling structural feature of the brake drum, thus reducing the extent of generated acoustic brake noises. Still further, the through holes provide a fluidic connection enabling a heat transfer from the inner receiving space of brake drum to the outside. This is advantageous in terms of heat management and may help to limit thermal expansions of components of the drum brake. As is generally known, the thermal expansions can lead to problems such as increased mechanical stresses or vibrations of components that are coupled to and/or contact one another.

The inner surface of the brake drum which bounds the receiving space may comprise a radially inner surface of the ring section. Differently put, the ring section may circumferentially extend about and/or confine the receiving space, in particular via an inner circumferential surface thereof.

Additionally or alternatively, the inner surface of the brake drum may comprise a first face of the end wall section, e.g. the face facing the inside of the brake drum and/or facing further brake drum components received in the receiving space. The first face may be opposite to a second face of the end wall section facing away from the receiving space and/or facing an adjacent vehicle component or axle component. The brake drum may be mounted to said adjacent vehicle component or axle component.

The outer surface of the brake drum may comprise a radially outer surface of the ring section and/or a second face of the end wall section. The second face of the end wall section may be opposite and e.g. extend in parallel to the first face of the end wall section.

The through-hole may be positioned so as to extend through the ring section or through the end wall section. In the latter case, the through-hole may extend axially. In case a plurality of through-holes is provided, a combination is possible of some of the through holes extending through the ring section and some of the through holes extending through the end wall section.

According to another embodiment, the brake dust collector overlaps with the through-hole (or with all through-holes of a possible plurality of through-holes). Put differently, the brake dust collector may cover and/or be positioned opposite the through-hole. This may include a respective relative arrangement when viewed in a radial direction (in particular when the through-hole is provided in the ring section of the brake drum). Alternatively, this may include a respective relative arrangement when viewed in an axial direction (in particular when the through-hole is provided in the end wall section of the brake drum). Generally, providing the respective overlap may include and/or may correspond to a longitudinal axis of the through-hole intersecting the brake dust collector.

According to a further example, the brake dust collector comprises at least one of the following materials (also referred to as dust collecting material herein):
an adhesive material;
a magnetic material;
an air-permeable material;
a porous material.

Any of these materials may form an exposed surface of the brake dust collector, in particular wherein said exposed surface faces the brake drum. The adhesive material may comprise a layer or lining comprising glue or another adhesive substance to which brake dust may adhere. The air-permeable material may be a porous material, and vice versa. The air-permeable material and/or the porous material may define openings, cavities, recesses of rough surface areas or any other structural feature in which the brake dust may be trapped. Non-limiting examples of air-permeable material and/or porous material include a textile material, a wool material, a felt material, a filter material, a mesh material and a foam material.

A (in particular radial and/or axial) distance between the brake dust collector and brake drum may be less than 10 cm, e.g. not more than 5 cm or not more than 1 cm, e.g. from 3 mm up to and including 5 mm. This limited distance improves compactness while a certain distance between the brake dust collector and brake drum, e.g. for preventing clogging by accumulating brake dust and simplifying assembly, is still ensured.

The brake dust collector may generally be positioned opposite to and/or facing an outer surface of the ring section. Additionally or alternatively, the brake dust collector may be positioned opposite to and/or facing an outer surface (i.e. a second face) of the end wall section.

In one aspect, the brake dust collector comprises at least one circumferential section that extends along at least part of the radially outer surface of the ring section. The circumferential section may be curved similarly, in particular similarly curved to the outer surface of the ring section. For example, a radial distance between the circumferential section and said outer surface of the ring section may be constant. The circumferential section may cover an angular section of the outer surface of the ring section of at least 20°, at least 90°, at least 180° or more.

There may be a plurality of circumferential sections of the brake dust collector. Each circumferential section out of said plurality may cover one angular section of the ring section. The circumferential sections may be similarly sized and/or may be arranged at similar radial distances to the outer surface of the ring section. They may be distributed along the circumference of the outer surface, in particular regularly distributed. The circumferential sections may each define a segment of a ring (in particular of a common ring).

In one example, the circumferential section extends in a ring-like manner along the entire circumference of the ring section. In other words, in this case the circumferential section covers an angular section of the outer surface of the ring section of 360°.

Providing a circumferential section of limited size and/or a plurality of circumferential sections provides weight savings. On the other hand, providing a ring-like circumferential section the e.g. define a closed or continuous ring along the outer surface of the ring section improves effectiveness of the brake dust collection.

According to a further example, the circumferential section overlaps with the ring section along at least part of an axial dimension of the ring section. Put differently, when viewed in an axial direction, the circumferential section may overlap at least part of the ring section. The larger the overlap, the larger the area available for dust collection.

According to a further embodiment, the brake dust collector may comprise at least one collector end wall section that extends along and in particular in parallel to at least a part of the end wall section of the brake drum. In particular when combined with a circumferential section as explained above, the brake dust collector may thus have a drum-like shape and/or a shape that is similar to the brake drum. In particular, the collector end wall section and the circumferential section may delimit a receiving space in which the brake drum is received. This provides a compact design for arranging dust collecting portions of the brake dust collector the opposite through holes in the brake drum.

Further, the brake dust collector (in particular at least the collector end wall section thereof) may comprise a material that is lighter than a material of the brake drum. In one embodiment, the entire brake dust collector comprises a respective lighter material. For example, the brake dust collector and in particular its end wall section may comprise a plastic material and/or or a non-metallic material or at most a lightweight metallic material, such as aluminium. This may be different from the brake drum which may comprise a more dense and stiff material, such as cast iron or steel.

According to a further example, the brake dust collector is fixed to the brake drum. For example, the brake dust collector may jointly rotate with the brake drum about the rotation axis. The brake dust collector may be directly fixed to the brake drum, in particular to an end wall section thereof and further in particular to a second face of said end wall section as disclosed herein.

Additionally or alternatively, the brake dust collector may be fixed to the ring section of the brake drum. The fixing may include a mechanical fixation, e.g. by means of fixing elements, such as bolts or other mechanically engaging structural features provided at the brake drum and brake dust collector.

In one example, the brake dust collector comprises a collector drum comprising the circumferential section and the collector end wall section. As noted above, this collector drum (and in particular an inner surface thereof, said inner surface e.g. comprising an inner circumferential surface of the circumferential section and an inwardly facing face of the collector end wall section) may define a receiving space in which the brake drum is arrangeable.

The collector drum may provide a sufficient stiffness for positioning a brake dust collecting surface relative to the brake drum. Also, it may be configured according to any of the lightweight materials discussed herein.

The collector drum may be directly made from or may comprise (e.g. as an integrated portion) a dust collecting material according to any of the examples disclosed herein. Alternatively, in addition to the collector drum, a collector portion may be provided which comprises a brake dust collecting material according to any of the examples disclosed herein. The collector portion may e.g. be configured as a lining or a layer attached to the collector drum and comprising or being made from said brake dust collecting material. The collector portion may be attached to an inner surface of a circumferentially extending section of the collector drum and/or to an inner face of the collector end wall section facing the brake drum.

According to a further embodiment, a cross-section of the through-hole has a varying and in particular a decreasing cross-sectional area when viewed from the receiving space of the brake drum towards the outer surface of the brake drum. Put differently, along a longitudinal axis or axis of extension of the through-hole, the cross-sectional area may be non-constant. In particular, it may be comparatively large at a first end of the through-hole that is adjacent to, opens out into the receiving space and/or end at the inner surface of the ring section. On the other hand, it may be comparatively small (e.g. not more than 75% or not more than 50% as large) at a second end of the through-hole that is adjacent to, opens out into the space surrounding the brake drum and/or ends at the outer surface of the ring section. In other words, along a path from the receiving space through the through-hole and towards the brake dust collector, the through-hole may have a narrowing and/or tapering cross-section. This may increase a flow speed of the brake dust when flowing through the through-hole, thereby promoting a suction effect sucking brake dust towards the brake dust collector.

The invention also relates to a brake drum for a brake drum assembly according any of the aspects disclosed herein, the brake drum having at least one of:
  a fixing portion for fixing the brake dust collector thereto, the fixing portion e.g. comprising a mechanical structure for engaging with a corresponding structure provided at the brake dust collector and/or a structural feature (in particular a hole or a recess) for receiving a mechanical fixing element, such as a bolt or rivet;
  the at least one through-hole which extends through the end wall section of the brake drum;
  a through-hole having a varying cross-sectional area and in particular a decreasing cross-sectional area when viewed from the inner surface of the brake drum towards its outer surface.

The brake drum and in particular any of the above features (e.g. the fixing portion or through-hole) may be configured according to any of the further examples disclosed herein.

The invention also relates to a brake dust collector for a brake drum assembly according any of the aspects disclosed herein, the brake dust collector comprising:
  a collector drum having a circumferential section extending about the rotation axis and a collector end wall section extending at an angle to the rotation axis; and
  a dust collecting material according to any of the examples disclosed herein.

The collector drum may be configured according to any of the further examples disclosed herein.

It is to be understood, that also a drum brake system is disclosed in which a brake drum is mounted or mountable to a vehicle component (e.g. a wheel) for a joint rotation therewith and receives at least one further drum brake component according to any of the examples disclosed herein in its receiving space. In particular, the drum brake system comprises a drum assembly according to any of the examples disclosed herein, including a brake dust collector configured and positioned according to any of the examples disclosed herein.

BRIEF DESCRIPTION OF DRAWINGS

Embodiments of the invention are discussed below with reference to the attached schematic figures. Throughout said figures, same or similar features may be marked with same reference signs.

DETAILED DESCRIPTION

Figure 1:
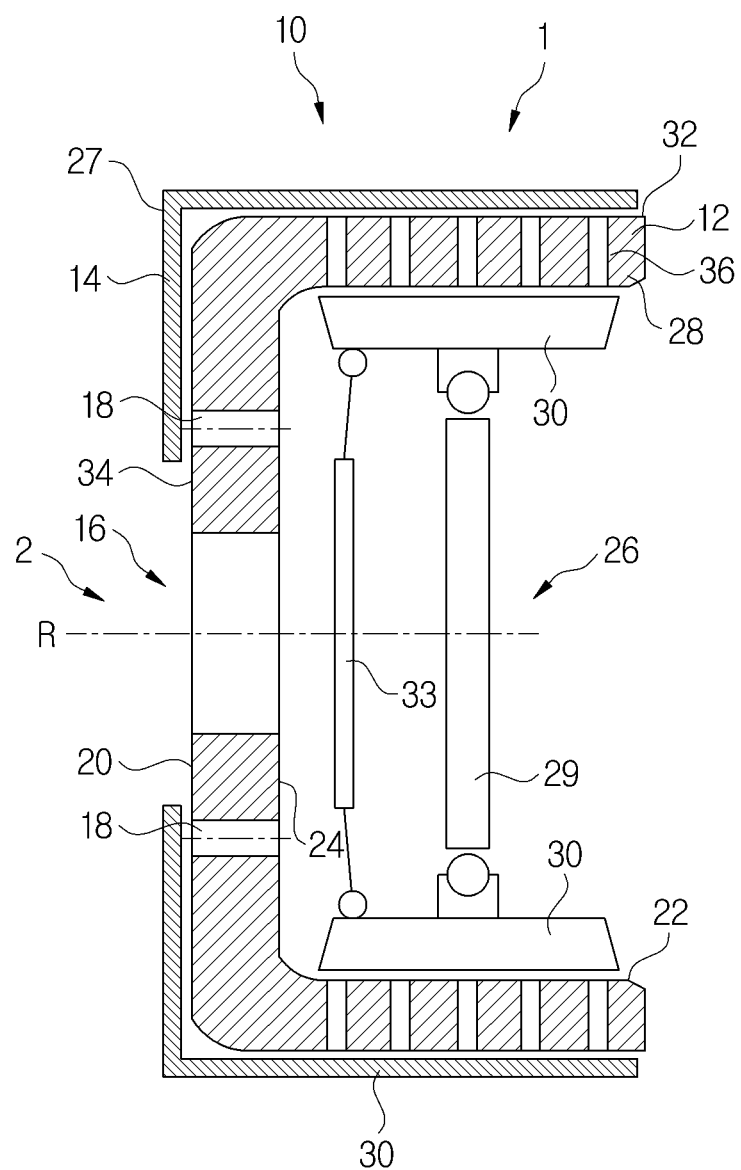
FIG. 1 is a cross-sectional view of a drum brake system comprising a brake drum assembly according to a first embodiment.

FIG. 1 is a sectional view of a drum brake system 1 comprising a brake drum assembly 10
according to a first embodiment. The brake drum assembly 10 comprises a brake drum 12 and a brake dust collector 14. In the first embodiment as well as in any of the further embodiments, the brake dust collector 14 and the brake drum 12 are each configured according to embodiments of the invention and, just like the brake drum assembly 10, represent independent aspects of the invention.

The brake drum assembly 10 is configured to rotate about a rotation axis R. The cross-sectional plane of FIG. 1 as well as of the cross-sectional views in any of the remaining figures comprises the rotation axis R. For rotating about the rotation axis R, the brake drum assembly 10 is fixed to a vehicle wheel or axle component. The vehicle wheel is not shown in detail but its position is generally indicated by reference sign 2. A hub section 16 is provided for implementing said fixation.

Also, optional through holes 18 are illustrated which are configured to receive bolts for fixing the brake drum 12 to a vehicle wheel or axle component. Even though illustrated otherwise, the through holes 18 are preferably not covered by the brake dust collector 14.

Alternatively, the through holes 18 may be used to insert a bolt or some other mechanical fixing element for fixing the brake dust collector 14 to the brake drum 12.

The brake drum 12 has an end wall section 20 extending at an angle and in particular orthogonally to the rotation axis R. The end wall section 20 is generally shaped as a circular plate-shaped member. The brake drum 12 also has a ring section 28 extending around the rotation axis R and concentrically with respect thereto. Accordingly, the brake drum 12 defines a circular cylinder having one open base surface (i.e. the base surface opposite to the end wall section 20).

An inner surface 22 of the brake drum 12 comprises a radially inner circumferential surface of the ring section 28 and a first axially inner face 24 of the end wall section 20. Said inner surface 22 bounds a receiving space 26 of the brake drum 12 in which further components of the drum brake system 1 are received. As a mere example, these include a schematically illustrated brake force actuator 29, two brake shoes 30 and a resetting spring 33, all of which are configured according to known solutions.

The brake dust collector 14 is shaped similarly to the brake drum 12. Accordingly, it comprises a collector end wall section 27 extending along the end wall section 20 of the brake drum 12. Also, it comprises a ring-like circumferential section 30 extending along the ring section 28 of the brake drum 12.

As evident from FIG. 1, the brake dust collector 14 faces an outer surface 32 of the brake drum 12, said outer surface 32 comprising an outer circumferential surface of the ring section 28 and a second face 34 opposite the first face 24 of the end wall section 20. Put differently, the brake dust collector 14 resembles the shape of the brake drum 12 and receives the brake drum 12 and/or at least surrounds the outer circumferential surface of its ring section 28.

It can also be seen that an axial dimension (e.g. length or width) of the ring section 28 is almost completely (or entirely) covered by the circumferential section of the brake dust collector 14. Also, the brake dust collector 14 is generally arranged in a constant distance of less than 1 cm to respectively opposite portions of the outer surface 32 of the brake drum 12.

In the shown example, the brake dust collector 14 has a homogeneous structure and material, e.g. a metallic mesh. In said mesh, brake dust particles may be trapped.

The brake dust particles reach the brake dust collector 14 via through holes 36 extending through the brake drum 12. In the shown example, a number of radially extending through holes 36 is provided in the ring section 28. The number and distribution of said through holes 36 in a circumferential an axial direction as not limited, but the overall number is higher than 10. The through holes 36 provide a pretty connection between the receiving space 26 and the brake dust collector 14. Specifically, they extend from the inner surface 22 of the brake drum 12 to an outer surface 32 thereof, so that brake dust particles generated at the brake shoes 30 can travel from an interior of the brake drum 12 to its exterior. There, they are collected by the brake dust collector 14 whose circumferential section 30 overlaps with and covers the openings 36.

Figure 2:
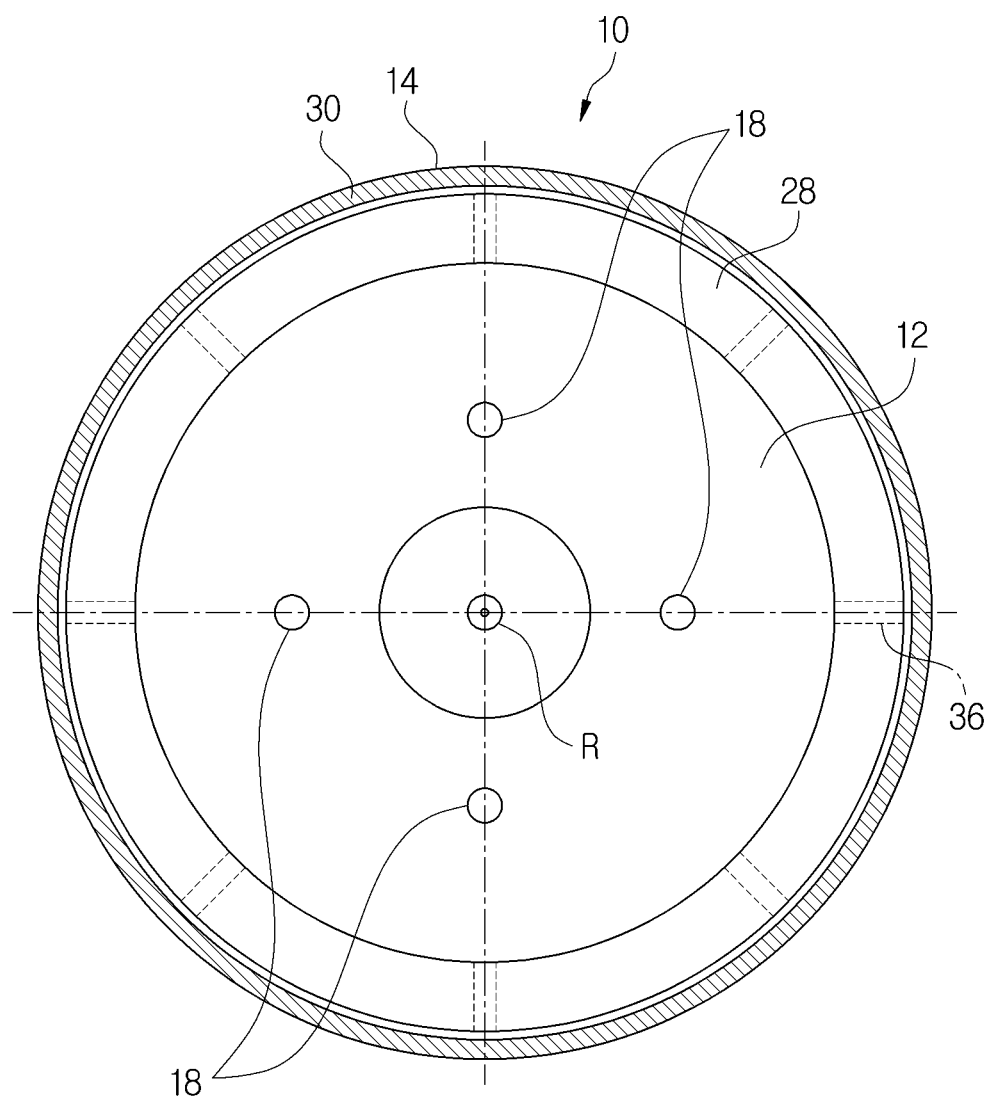
FIG. 2 is a front view of the brake drum assembly system of FIG. 1.

FIG. 2 is a front view of the brake drum assembly 12 of FIG. 1 without the further components 29, 30, 33 of the brake drum assembly 10 of FIG. 1 with. Accordingly, the rotation axis R extends orthogonally to the image plane. In this case, the distribution of the through holes 36 in a circumferential direction is indicated. The through holes 36 are regularly distributed in the circumferential direction, i.e. are spaced apart by similar angular distances of e.g. 45°. Further, the ring like the extension of the circumferential section 30 of the brake dust collector 14 is visible.

Figure 3:
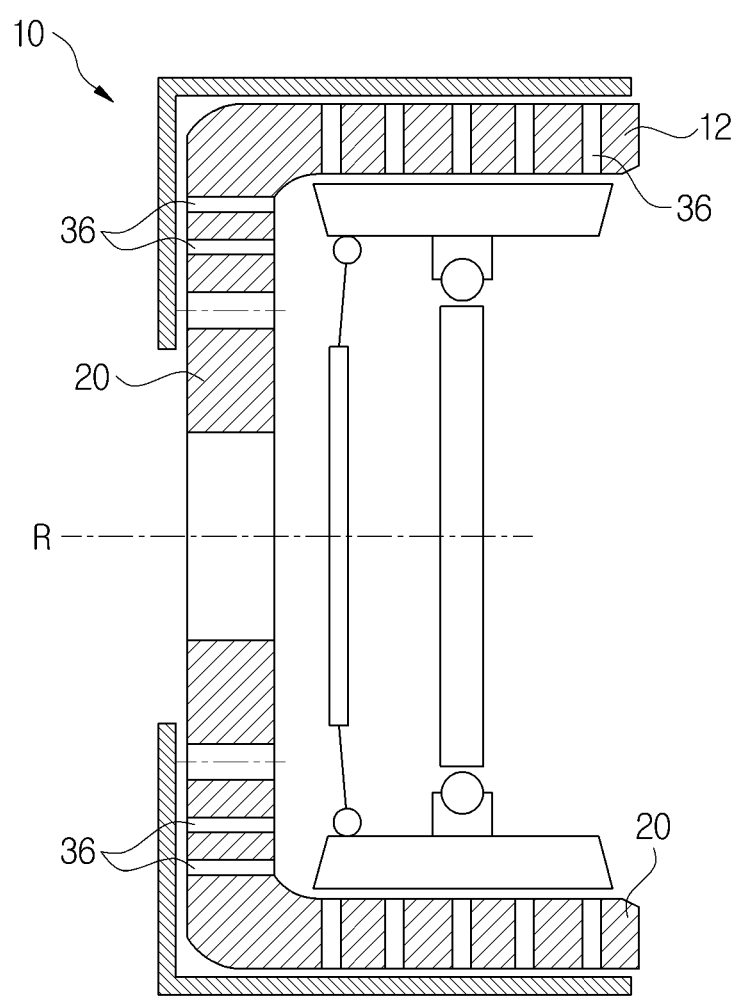
FIG. 3 is a cross-sectional view of a drum brake system comprising a brake drum assembly according to a second embodiment.
Figure 4:
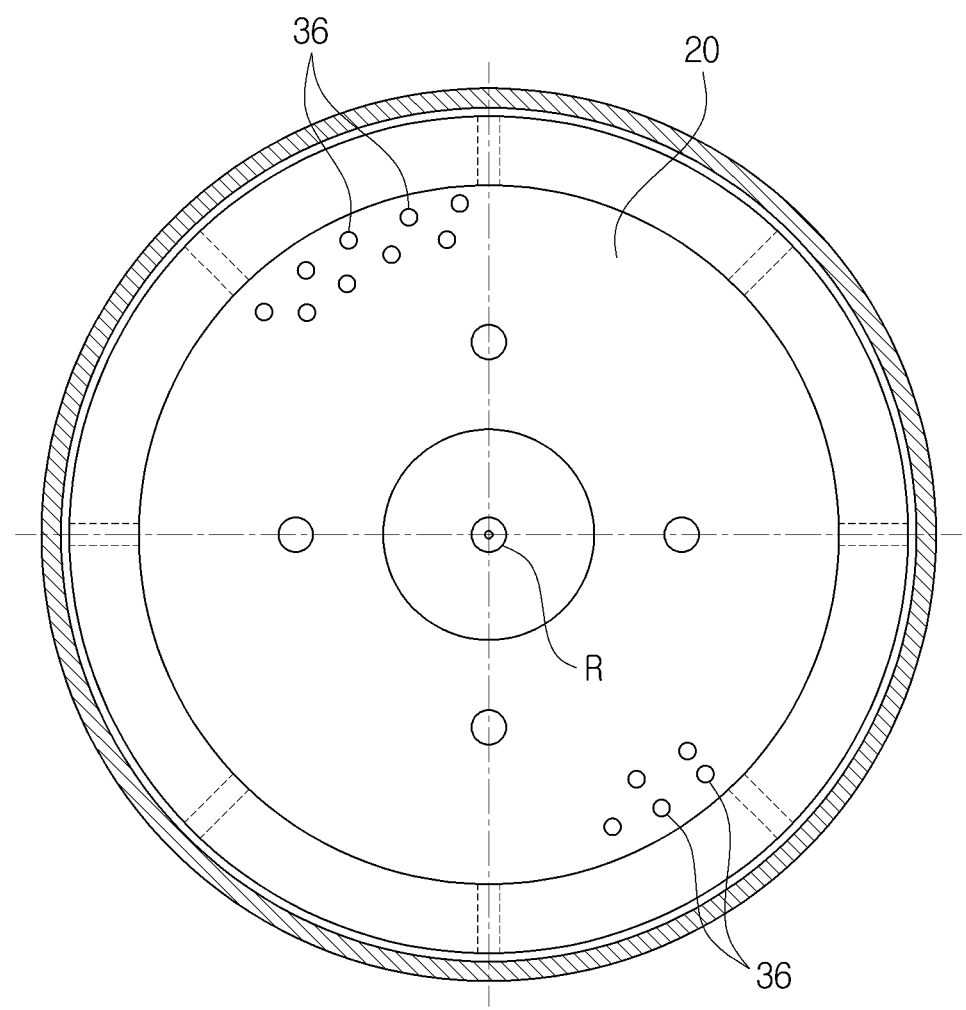
FIG. 4 is a front view of the brake drum assembly of FIG. 3.

FIGS. 3 and 4 show a second embodiment of a drum brake assembly 10 with the depicted views being generally similar to those of FIGS. 1 and 2, respectively. A difference to the first embodiment is the provision of through holes 36 also in the end wall section 20 of the brake drum 12. These through holes 36 may generally be provided additionally or alternatively to the through holes 36 in the ring section 28.

Again, the number and position of the through holes 36 in the end wall section 20 is merely by way of example. The front view of FIG. 4 shows an exemplary position of selected ones of the through holes 36 in the end wall section 20. Even though not depicted, said through holes 36 may be distributed regularly in a circumferential direction and/or may be arranged in any part of the end wall section 20.

Figure 5:
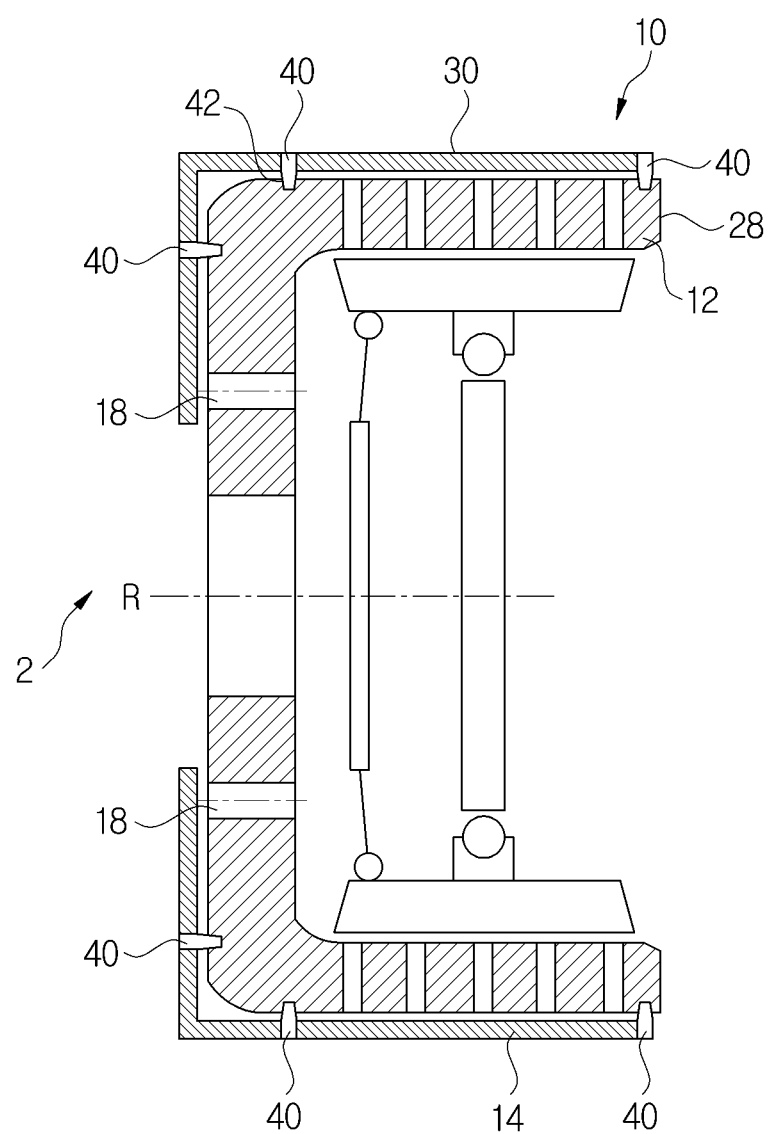
FIG. 5 is a cross-sectional view of a drum brake system comprising a brake drum assembly according to a third embodiment.
Figure 6:
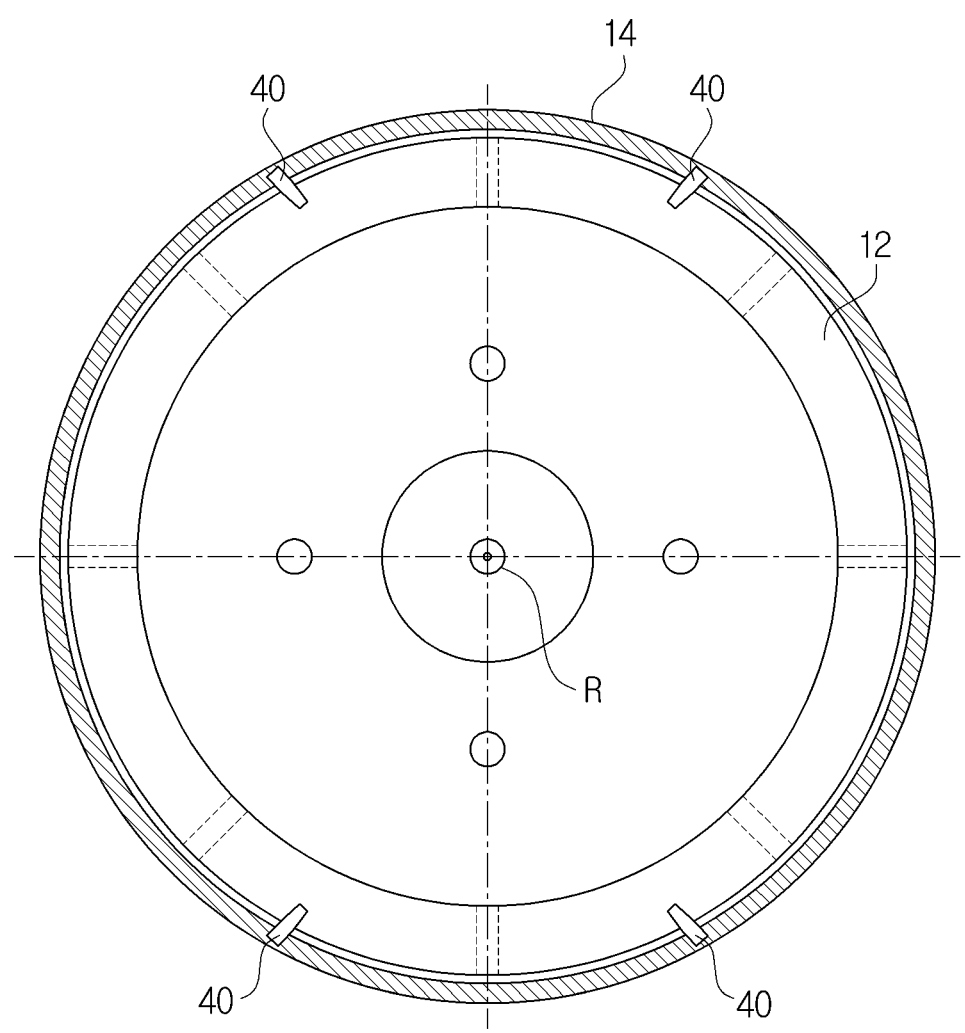
FIG. 6 is a front view of the brake drum assembly of FIG. 5.

FIGS. 5 and 6 show a third embodiment of a drum brake assembly 10, with the depicted views being generally similar to those of FIGS. 1 and 2 as well as FIGS. 3 and 4, respectively. The third embodiment is similar to the first one with the only difference concerning additional fixing members 40 for fixing the brake dust collector 14 to the brake drum 12. As evident from FIG. 6, the fixing members 40 may be distributed in a circumferential direction along the brake dust collector 14 and ring section 12.

From FIG. 5, it is evident that the fixing members 40 can be located at and connected by the end wall section 20 and collector end wall section 27 and, additionally or alternatively, at the circumferential section 30 and ring section 28. The fixing members 40 may e.g. be clamps, bolts or mechanical engagement structures. In FIG. 5, it can be seen that the brake drum 12 comprises recesses 42 for receiving each of the fixing members 14. These recesses 42 (only marked for one of the fixing members 40 in FIG. 5) form fixing portions of the brake drum 12. Additionally or alternatively, the optional through holes 18 may, when receiving a bolt for connecting to the brake dust collector 14, form a respective fixing portion.

Figure 7:
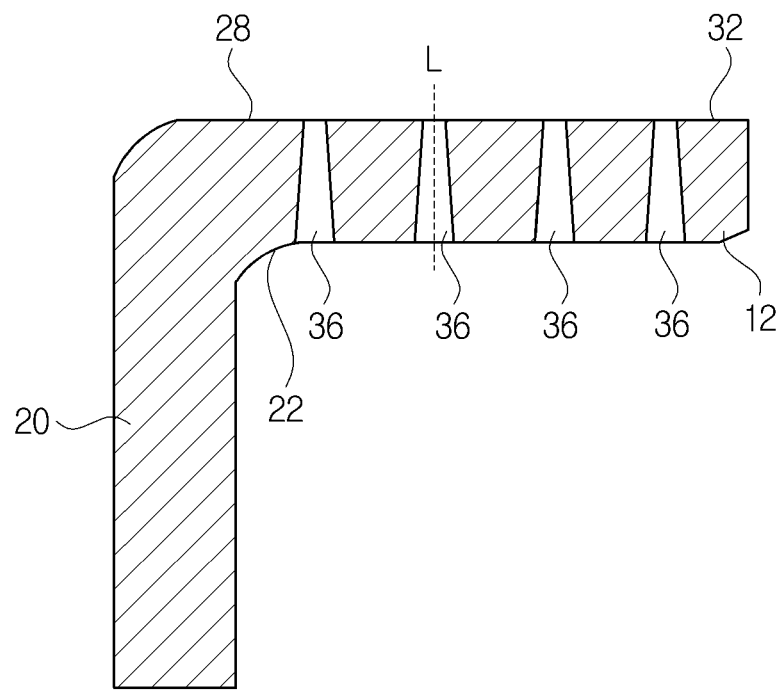
FIG. 7 is a sectional view of part of a brake drum of a brake drum assembly according to a fourth embodiment.

FIG. 7 shows a part of a brake drum 12 according to a further embodiment. The depicted part includes part of the ring section 28 as well as of the end wall section 20. A number of through holes 36 is shown, whose exact number, distribution and orientation is non-limiting. Again, the through holes 36 extend radially from an inner surface 22 of the brake drum 12 to an outer surface 32. They extend along a longitudinal axis L. When viewed along said longitudinal axis L, a cross-sectional area (e.g. as defined by an extension orthogonally to the longitudinal axis L) decreases. This narrowing or tapering of the through holes 16 towards the surroundings of the brake drum 12 increases a flow speed of the brake dust to the outside. In the depicted example, the cross-sectional area decreases continuously which is particularly effective for increasing said flow speed.

Figure 8:
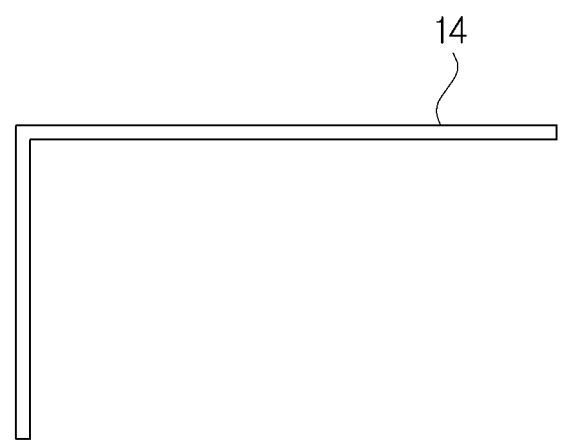
FIG. 8 is a sectional view of part of a brake dust collector of a brake drum assembly according to a fifth embodiment.
Figure 9:
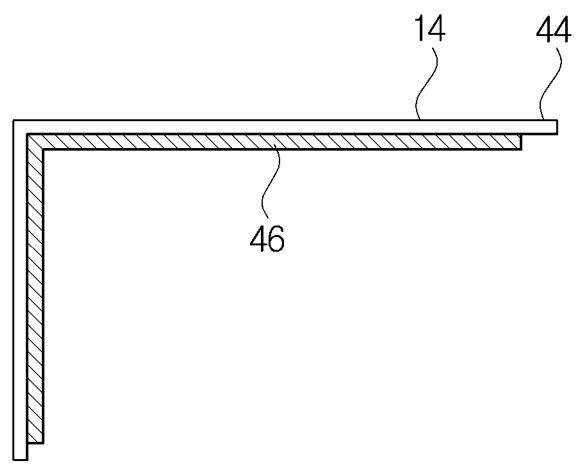
FIG. 9 is a sectional view of part of a brake dust collector of a brake drum assembly according to a sixth embodiment.

FIGS. 8 and 9 are partial views of the brake dust collector 14 according to further embodiments. FIG. 8 again depicts a version similar to that of the previous figures with the brake dust collector 14 being a homogeneous and in particular a one-piece member. In FIG. 9, the brake dust collector 14 is non-homogeneous but comprises a number of separate members which comprise a material that is different from one another. Specifically, a collector drum 44 is shown.

At Its inside, a dust collecting lining 46 is provided. The collector drum 44 is made of a lightweight material that is e.g. not configured to collect brake dust. It has a stabilising and/or carrying function. The dust collecting lining 46, on the other hand, comprises a dust collecting material according to any of the examples disclosed herein. It is arranged to face the outer surface 32 of the brake drum 12 and, similar to the examples of FIGS. 1, 3 and 5, configured to be arranged oppositely to and overlapping with the through holes 36 of said brake drum 12.

LIST OF REFERENCE SIGNS 1 brake system
10 brake drum assembly
12 brake drum
14 brake dust collector
16 hub section
18 through-hole/fixing portion
20 end wall section
22 inner surface
24 first surface
26 receiving space
27 collector end wall section
28 ring section
29 actuator
30 brake shoe
32 outer surface
33 resetting spring
34 second surface
36 through-hole
40 fixing member
42 fixing portion
44 collector drum
46 dust collecting lining
R rotation axis
L longitudinal axis

What is claimed is:

1. Brake drum assembly for braking at least one vehicle wheel that rotates about a rotation axis, the brake drum assembly comprising:
   a brake drum configured to rotate about the rotation axis and having a ring section extending circumferentially about the rotation axis and an end wall section extending at an angle to the rotation axis, the brake drum having an inner surface bounding at least part of a receiving space of the brake drum;
   at least one brake dust collector that faces an outer surface of the brake drum,
   wherein the brake drum comprises at least one through-hole providing a path through which brake dust can move from the receiving space to the dust collector.

2. Brake drum assembly according to claim 1,
   wherein the inner surface of the brake drum comprises at least one of a radially inner surface of the ring section and a first face of the end wall section; and/or
   wherein the outer surface of the brake drum comprises at least one of a radially outer surface of the ring section and a second face of the end wall section.

3. Brake drum assembly according to claim 1,
   wherein the through-hole extends through the ring section.

4. Brake drum assembly according to claim 1,
   wherein the through-hole extends through the end wall section.

5. Brake drum assembly according to claim 1,
   wherein the brake dust collector overlaps with the through hole.

6. Brake drum assembly according to claim 1,
   wherein the brake dust collector comprises at least one of the following materials:
   an adhesive material;
   a magnetic material;
   an air-permeable material;
   a porous material.

7. Brake drum assembly according to claim 1,
   wherein the brake dust collector comprises at least one circumferential section, extending along at least part of the radially outer surface of the ring section.

8. Brake drum assembly according to claim 7,
   wherein the circumferential section extends in a ring-like manner along the entire circumference of the ring section.

9. Brake drum assembly according to claim 7,
   wherein the circumferential section overlaps with the ring section along at least part of an axial dimension of the ring section.

10. Brake drum assembly according to claim 7,
    Wherein the brake dust collector comprises a collector drum comprising the circumferential section and the collector end wall section and wherein the brake dust collector comprises at least one of the following materials:
an adhesive material;
a magnetic material;
an air-permeable material;
a porous material.

11. Brake drum assembly according to claim 1, wherein the brake dust collector comprises at least one collector end wall section that extends along at least a part of the end wall section of the brake drum.

12. Brake drum assembly according to claim 1, wherein the brake dust collector comprises a material that is lighter than a material of the brake drum.

13. Brake drum assembly according to claim 1, wherein the brake dust collector is fixed to the brake drum.

14. Brake drum assembly according to claim 1, wherein a cross-section of the through-hole has a decreasing cross-sectional area when viewed from the inner surface of the brake drum towards the outer surface of the brake drum.

15. Brake drum assembly according to claim 1, the brake drum having at least one of:
a fixing portion for fixing the brake dust collector thereto;
the at least one through-hole extending through the end wall section of the brake drum;
wherein a cross-section of the through-hole has a decreasing cross-sectional area when viewed from the inner surface of the brake drum towards the outer surface of the brake drum.

16. Brake drum assembly according to claim 1, the brake dust collector comprising a collector drum having a circumferential section extending about the rotation axis, a collector end wall section extending at an angle to the rotation axis and wherein the brake dust collector comprises at least one of the following materials:
an adhesive material;
a magnetic material;
an air-permeable material;
a porous material.

* * * * *